(12) United States Patent
Kharas

(10) Patent No.: US 6,592,833 B1
(45) Date of Patent: Jul. 15, 2003

(54) METHOD OF NOX ABATEMENT IN HIGH TEMPERATURE LEAN NOX CATALYST SYSTEMS

(75) Inventor: Karl C. C. Kharas, Tulsa, OK (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/420,150

(22) Filed: Oct. 18, 1999

(51) Int. Cl.$^7$ .................................................. F01N 3/10
(52) U.S. Cl. ................. 423/239.1; 423/213.2; 423/213.5
(58) Field of Search ........................ 423/213.2, 213.5, 423/239.1

(56) References Cited

U.S. PATENT DOCUMENTS

| | | | | |
|---|---|---|---|---|
| 4,732,743 A | * | 3/1988 | Schmidt et al. | 423/239.1 |
| 5,055,278 A | * | 10/1991 | Reidick | 423/235 |
| 5,255,512 A | * | 10/1993 | Hamburg et al. | 60/274 |
| 5,284,016 A | * | 2/1994 | Stark et al. | 60/303 |
| 5,472,673 A | * | 12/1995 | Goto et al. | 422/169 |
| 5,543,124 A | * | 8/1996 | Yokota et al. | 423/239.1 |
| 5,609,022 A | * | 3/1997 | Cho | 60/274 |
| 5,897,846 A | * | 4/1999 | Kharas et al. | 423/213.2 |
| 5,921,079 A | * | 7/1999 | Harris | 60/288 |
| 5,993,203 A | * | 11/1999 | Koppang | 432/180 |
| 6,001,318 A | * | 12/1999 | Tillaart et al. | 423/212 |

FOREIGN PATENT DOCUMENTS

| CA | 1100292 | * | 5/1981 |
|---|---|---|---|

OTHER PUBLICATIONS

SAE Technical Paper No. 982604; Analyses of System Factors Affecting Performance in Lean NOx Catalysis.2. The Deleterious Role of Parasitic Homogeneous Hydrocarbon Oxidation on the Performance of High Temperature Lean NOx Catalysts; K.C.C. Kharas, M.J. Miller and Ji–Yang Yan; 1998.

* cited by examiner

*Primary Examiner*—Tom Dunn
*Assistant Examiner*—Christina Ildebrando
(74) *Attorney, Agent, or Firm*—Vincent A. Cichosz

(57) ABSTRACT

A method of NOx abatement comprising the steps of generating a gas stream containing hydrocarbons and NOx, maintaining the temperature of the gas stream within the range of about 150° C. to about 550° C., maintaining the residence time of said hydrocarbons upstream of a NOx abatement catalyst so as to reduce the rate of hydrocarbon oxidation, and contacting the gas stream with said NOx abatement catalyst.

34 Claims, 10 Drawing Sheets

METHOD OF NOX ABATEMENT IN HIGH TEMPERATURE LEAN NOX CATALYST SYSTEMS

TECHNICAL FIELD

The invention relates to NOx catalyst systems. More specifically, this invention relates to a method for controlling parasitic hydrocarbon oxidation in high temperature NOx catalyst systems.

BACKGROUND OF THE INVENTION

Internal combustion engines produce large amounts of exhaust gases consisting primarily of carbon dioxide ($CO_2$), water, unburned hydrocarbons (HCs), carbon monoxide (CO) and oxides of nitrogen (NOx). Since the 1970's the emission of unburned HCs, CO and NOx has been regulated and the world-wide regulatory climate for reducing exhaust gases has become ever more stringent. As a result, many present day engines, especially gasoline-fueled engines used for passenger automobiles and the like, operate very near stoichiometric conditions, where catalyst technology that allows simultaneous abatement of unburned HCs, CO, and NOx, is well advanced. There is a desire to introduce diesels and gasoline lean-burn vehicles on a broader basis because of their significant fuel economy advantages with attendant lower fuel costs. These vehicles operate with a ratio of air to fuel in the combustion mixture supplied to the engine that is maintained above the stoichiometric ratio so that the resulting exhaust gases are "lean," i.e., the exhaust gases are relatively high in oxygen content and relatively low in reductants content, e.g., HC, CO, and/or hydrogen (H).

Although lean burn engines provide enhanced fuel economy, they have the disadvantage that conventional three-way catalysts (TWC) cannot adequately abate the NOx component of the pollutants in the gas stream. Considerable research is currently underway toward the development of catalysts that are capable of decomposing or reducing NOx under oxidizing conditions. Much of this research focuses on using hydrocarbons in engine exhaust to catalytically reduce oxides of nitrogen under lean conditions. While advances are being made, there is a need in the industry for increased efficiencies of lean NOx catalyst systems.

The invention disclosed herein addresses these and other concerns.

SUMMARY OF THE INVENTION

In accordance with the present invention, the shortcomings and disadvantages of the prior art are overcome by utilizing a method of NOx abatement comprising: generating a gas stream containing hydrocarbons and NOx, maintaining the temperature of the gas stream within the range of about 150° C. to about 550° C., controlling the residence time of said hydrocarbons upstream of a NOx abatement catalyst so as to reduce the rate of hydrocarbon oxidation, and contacting the gas stream with said NOx abatement catalyst.

BRIEF DESCRIPTION OF THE DRAWING

The following figures are meant to be exemplary, not limiting.

DETAILED DESCRIPTION OF THE INVENTION

Figure 1:
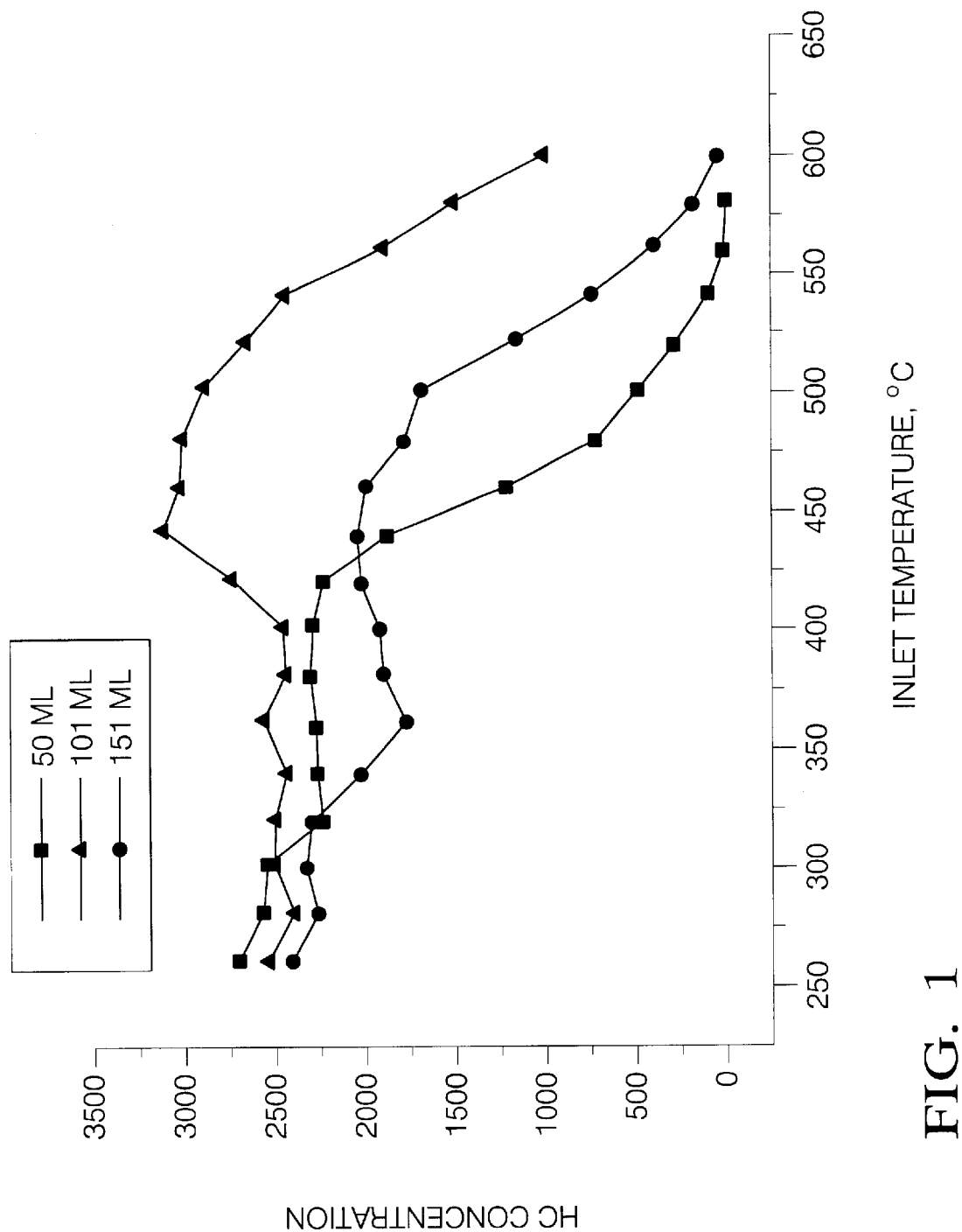
FIG. 1 is a plot of HC concentration versus inlet temperature.

The NOx abatement system disclosed herein concerns chemical phenomena that hinder the delivery of hydrocarbons to the NOx catalyst under lean conditions. Specifically, hydrocarbons can oxidize in the gas phase upstream of the catalyst, thereby starving the catalyst of hydrocarbons needed to reduce NOx. This chemistry may be referred to as parasitic hydrocarbon oxidation. Since the hydrocarbons tend to burn in the hot, oxidizing gasses that a found upstream, the NOx catalyst is rendered considerably less effective as a large portion of the hydrocarbons fail to reach it. Thus, the efficiency level of lean NOx abatement systems depends, not only on the NOx catalyst itself, but also on the conditions upstream of the catalyst.

More particularly, parasitic hydrocarbon oxidation will suppress lean NOx catalysis if the flow rates of exhaust gases upstream of the catalyst are sufficiently low, if the volume of exhaust gases upstream of the catalyst is sufficiently high, and/or the temperature gradient upstream of the catalyst is sufficiently large. Accordingly, the NOx abatement system comprises generating a gas stream containing hydrocarbons and NOx, maintaining the hydrocarbon residence time and the temperature of the gas stream within appropriate ranges, and contacting the gas stream with a suitable NOx abatement catalyst.

The lean NOx catalyst may be any lean NOx catalyst compatible with the environment of an exhaust system. In particular, a suitable catalyst that will function in the high temperature environment of an exhaust system can be employed. A suitable catalyst will, preferably, selectively reduce NOx in the presence of excess oxygen. A preferred catalyst will use HCs, CO and $H_2$ to reduce NOx when oxygen is present in concentrations greater than needed stoichiometrically to oxidize all HCs, CO and $H_2$. One preferred group of catalysts suitable for use with the NOx abatement system comprises noble metals (i.e., platinum (Pt), palladium (Pd), ruthenium (Ru), rhodium (Rh), osmium (Os), and iridium (Ir)), gold, copper, silver, gallium, indium, tin, and other metals, as well as alloys, salts and mixtures thereof Examples include catalytically effective amounts Pt/Au, Pt/Rh alloys and Ores, oxidized Cu, oxidized Ag, $Ga_2O_3$, $In_2O_3$, and $SnO_2$, and others dispersed on supports including, but not limited to, cordierite, silica and alumina, as well as other materials such as ceramics and the like, and mixtures thereof Some preferred catalysts are described in U.S. Pat. No. 6,087,295, which is fully incorporated herein by reference. More preferably, a catalyst to be used in accordance with the NOx abatement system is a sulfur dioxide ($SO_2$)-tolerant silver oxide catalyst such as that disclosed in U.S. Pat. No. 5,980,844, which is fully incorporated herein by reference. Still more preferably, a catalyst to be used in accordance with the NOx abatement system comprises a catalytic metal component comprising a crystalline aluminosilicate zeolite loaded with a metal. Preferred metals for this purpose include copper and silver. Examples of such catalysts are described in U.S. Pat. No. 5,908,806, which is fully incorporated herein by reference.

The NOx abatement system manipulates HC residence time so as to reduce, and preferably minimize, parasitic HC oxidation. The extent of parasitic HC oxidation within a catalytic system is a function of (a) pre-catalyst residence time of HC and (b) temperature. Pre-catalyst residence time refers to the amount of time in which hydrocarbons are in transit within the catalyst system but prior to contacting the catalyst itself (i.e., the amount of time for which the hydrocarbon is upstream from the catalyst). In the context of lean NOx catalysis, a single catalyst system can be considered as a two-zone reactor. The first zone encompasses the region from the location where hydrocarbons (intended for use by the lean NOx catalyst) are introduced into the system, to the NOx catalyst inlet (i.e., upstream from the catalyst). For example, for hydrocarbons that are generated by the engine, the first zone extends from the cylinder exhaust valve to the NOx catalyst inlet. As another example, for hydrocarbons that are injected into the exhaust stream, the first zone extends from the hydrocarbon injector to the catalyst inlet. The first zone is where the majority of parasitic hydrocarbon oxidation occurs. The second zone comprises the region in which the lean NOx catalyst resides. In the second zone, catalytic reactions dominate. The NOx abatement system may comprise a single two-zone reactor or a plurality of two-zone reactors connected in series or parallel.

The NOx abatement system is operated in such a manner as to cause hydrocarbon residence time to be sufficiently short such that the percentage of HC oxidation is less than about 35%, preferably less than about 25%, and most preferably less than about 15%. More particularly, the NOx abatement system is operated in such a manner as to cause hydrocarbon residence time to be less than about 95 milliseconds or below about 85 milliseconds (msec), with less than about 75 msec preferred, and the range of about 20 msec to about 65 msec being more preferred. Target residence times may be facilitated by various means. One suitable means involves manipulation of the volume of the first zone of the NOx abatement system. Hydrocarbon residence time can be reduced by decreasing the volume of the first zone. As first zone volume is decreased, the speed with which HCs reach the catalyst increases, thus better avoiding parasitic oxidation. Preferably, first zone volume is reduced by shortening the distance between the catalyst and the HC first zone entry point.

Hydrocarbon residence time may also be manipulated by injection of hydrocarbons into the exhaust stream. In current applications, hydrocarbons enter the NOx abatement system from the engine only. Due to high temperatures in the first zone, particularly at high vehicle speeds and loads, it is difficult to maintain low levels of parasitic hydrocarbon oxidation when hydrocarbons are provided to the exhaust gas mixture solely by engine controls. Thus, it is preferable to inject hydrocarbons into the exhaust gas downstream of the engine cylinder, with injection downstream of any turbocharger more preferred, and injection near (e.g., within about 10 centimeters) of the NOx catalyst inlet being especially preferred.

An operating temperature suitable for the NOx abatement system will be high enough to ensure activation of the catalyst and low enough to protect against thermal deactivation of the catalyst. It should be noted that the temperature within the NOx abatement system will vary with engine performance. At steady state, the catalyst temperature is nearly equal to the temperature of the upstream zone. For non-steady state operation, the temperatures of the catalyst and the upstream zone will tend to be cooler than at steady state for a given speed and load. At non-steady state, NOx abatement system may be maintained within the temperature range of about 150° C. to about 550° C. A preferred temperature rage at which the NOx abatement system may be maintained, whether at steady state conditions or non-steady state conditions, is from about 300° C. to about 550° C. More preferably, the temperature of the NOx abatement system is maintained within the range of about 300° C. to about 500° C., or about 350° C. to 500° C.

Figure 2:
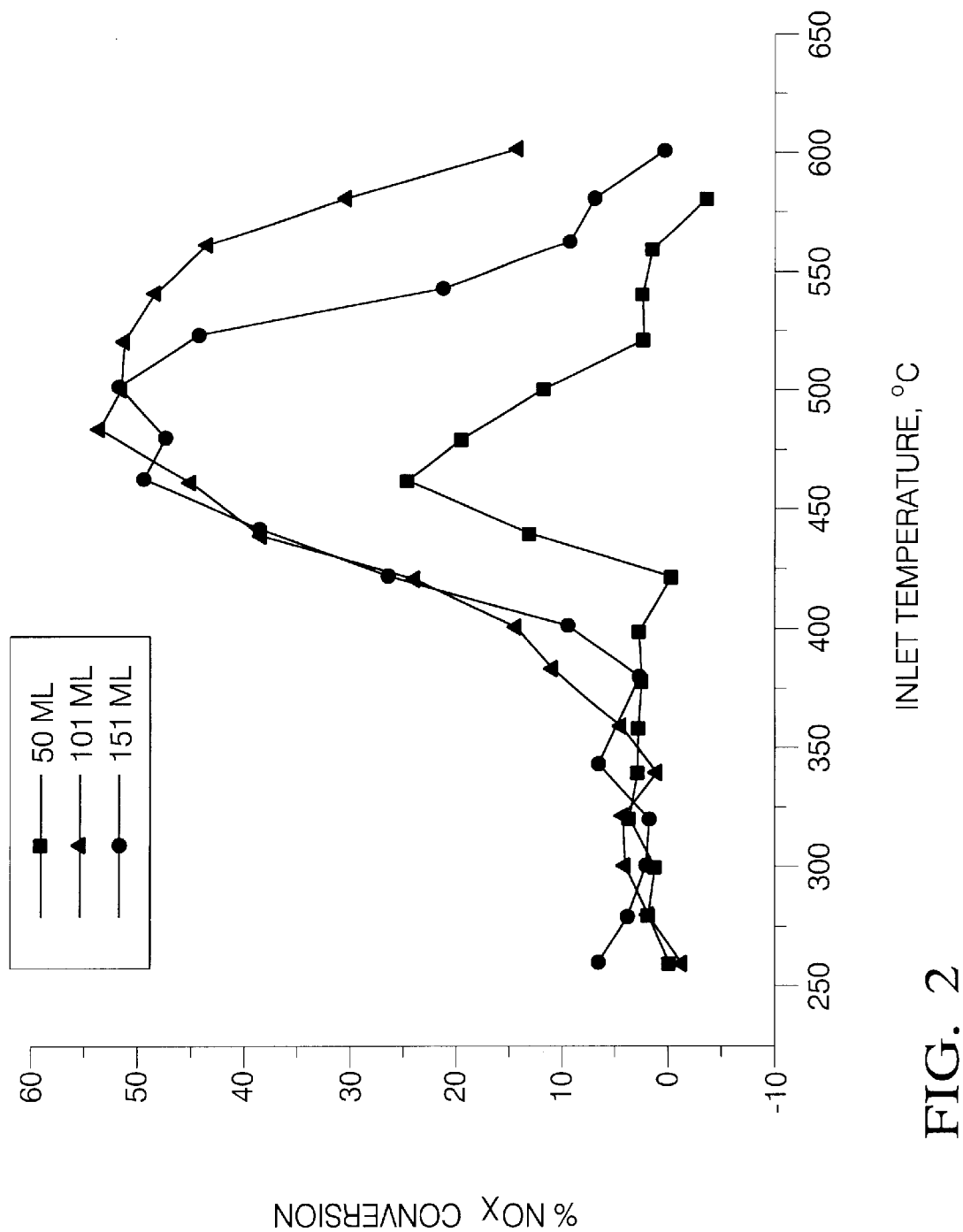
FIG. 2 is a plot of NOx conversion versus inlet temperature.

Parasitic homogeneous oxidation of HCs will suppress lean NOx catalysis if the flow rates of exhaust gas through zone 1 are sufficiently low, or the volume of exhaust gas in zone 1 is sufficiently high, or the temperature gradient in zone 1 is sufficiently large. This is shown in FIGS. 1 and 2, which show lean NOx performance (FIG. 2) and the extent of parasitic oxidation (FIG. 1) in a diesel cell under conditions of constant space velocity (namely 50,000 $hr^{-1}$) through the catalysts. Catalyst volume was varied from 50 to 151 ml and flow rates through zone 1 were varied accordingly, using orifice plates. With catalyst volume at 50 ml, flow rates are the lowest (8.82 scfm), and HC residence time in zone 1 is greatest. Poor lean NOx control is observed, and HC concentrations arriving at the catalyst inlet are at their lowest. When the catalyst volume is at 101 ml, gas flow rates are somewhat greater (17.8 scfm), and HC residence time in zone 1 is somewhat less. Moderate lean NOx control is observed, but a premature decline in NOx conversion at about 500° C. occurs due to parasitic HC oxidation. When the catalyst volume is at 151 ml, gas flow rates are highest (26.7 scfm), and HC residence time in zone 1 is at its least. As shown in FIG. 1, the concentration of HCs reaching the catalyst inlet at 550° C. is about 75% of the concentration observed at 450 ° C. Thus, parasitic oxidation did not cause a significant decrease in HC concentrations until temperatures exceeded 550 ° C. Consequentially, there was no resulting attenuation of lean NOx catalysis until temperatures exceeded 550 ° C.

The temperature evolution and related chemistry of HC, CO, NO, and NOx, as well as gas stream flow and HC residence time, are discussed in detail below. Referring to the Figures generally, Catalyst A is a Cu/Ag zeolite of the type disclosed in U.S. Pat. No. 5,908,806 and Catalyst B is a $SO_2$-tolerant silver oxide catalyst of the type disclosed in U.S. Pat. No. 5,980,844. Unless otherwise indicated, the data depicted in each Figure were obtained with a 1.9 turbo direct injection (TDI) diesel engine mounted on a 350 hp eddy current dynamometer. The engine was run at about 1800 rpm and 60 ft-lb to generate abase exhaust containing about 500 parts-per-million by volume (ppmv) NOx. A portion of the exhaust was passed through a pair of heat exchangers, in series, such that the temperature of the exhaust can be controlled at the catalyst inlets (downstream) to temperatures between 140–600° C. The first heat exchanger functioned to reduce temperature (chiller), the second exchanger functioned as a heater. Downstream of the heater, HCs were injected using a syringe pump (ISCO 500D with a series D controller) coupled to an air-assisted injector to yield a specified target molar $HC_1$/NOx ratio, typically around 9. The position of the HC injection was varied between 0.7–1.5 meter upstream of the catalyst inlets. The exhaust was then split into six parallel streams and passed through chambers containing 50–160ml of catalyst. The flow rates through the catalysts and the bypass were measured;and controlled using orifice plates. Gas composition was monitored at the catalysts inlet and each of the six outlets using a Pierburg FID PM-2000 heated HC analyzer, Pierburg model CFP PM-2000 chemiluminescent NOx analyzer, a Horiba CLA-22A chemiluminescent NO analyzer, a Horiba AIA-23(AS) NDIR CO analyzer, a Pierburg PIA-2000 NDIR $N_2O$ analyzer, a Horiba AIA-23 NDIR $CO_2$ analyzer, and a Horiba MPA-21A Horiba magnetopneumatic $O_2$ analyzer.

Each catalyst was loaded into a different reactor chamber on the engine cell and evaluated simultaneously four times (T1, T2, T3 and T4). Decane was injected as a supplemental HC. For T1 and T3, the nominal $HC_1/NOx$ was 9; for T2 and T4, it was 6. All other test conditions were held constant.

Figure 3:
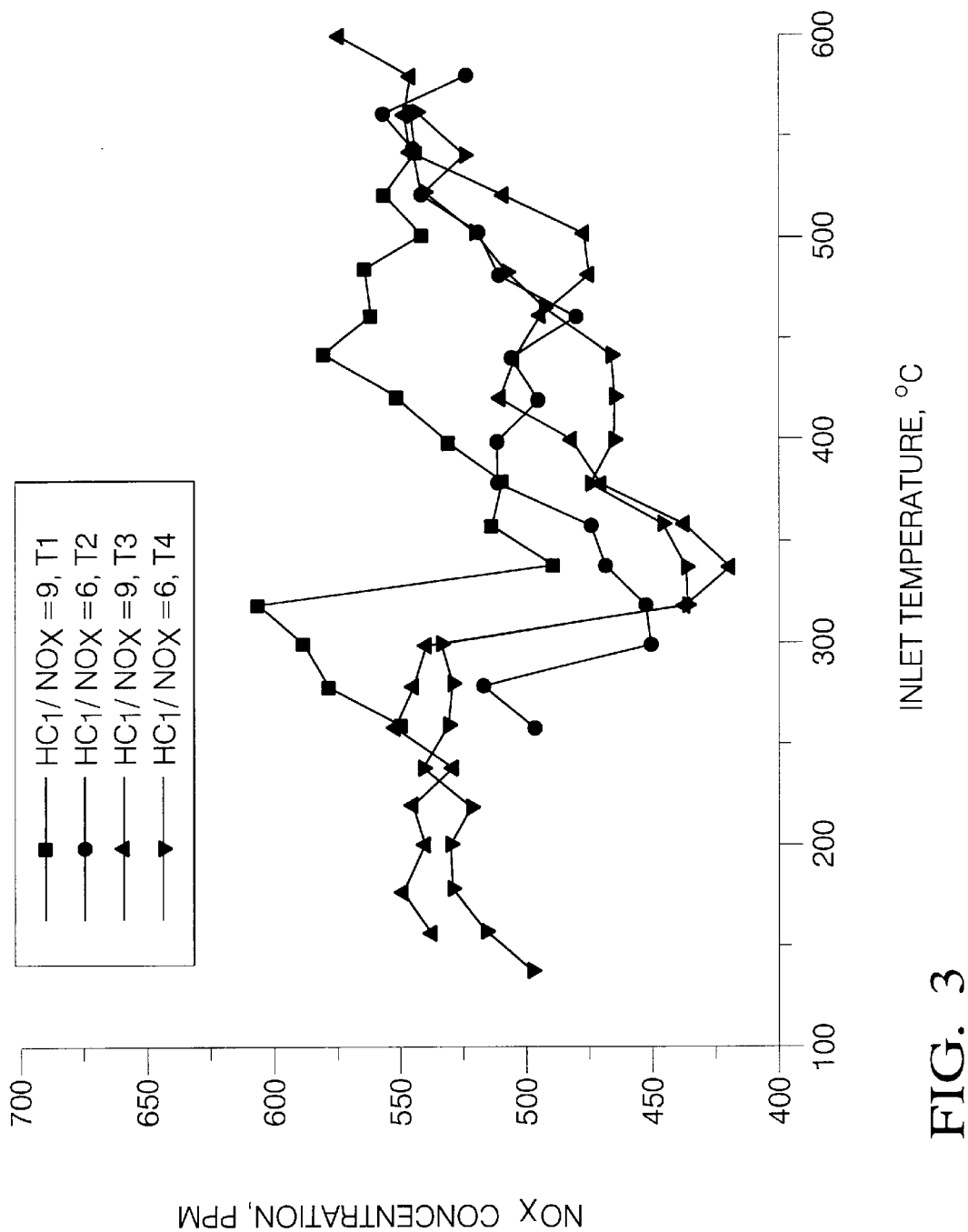
FIG. 3 is a plot of NOx concentration versus inlet temperature.
Figure 4:
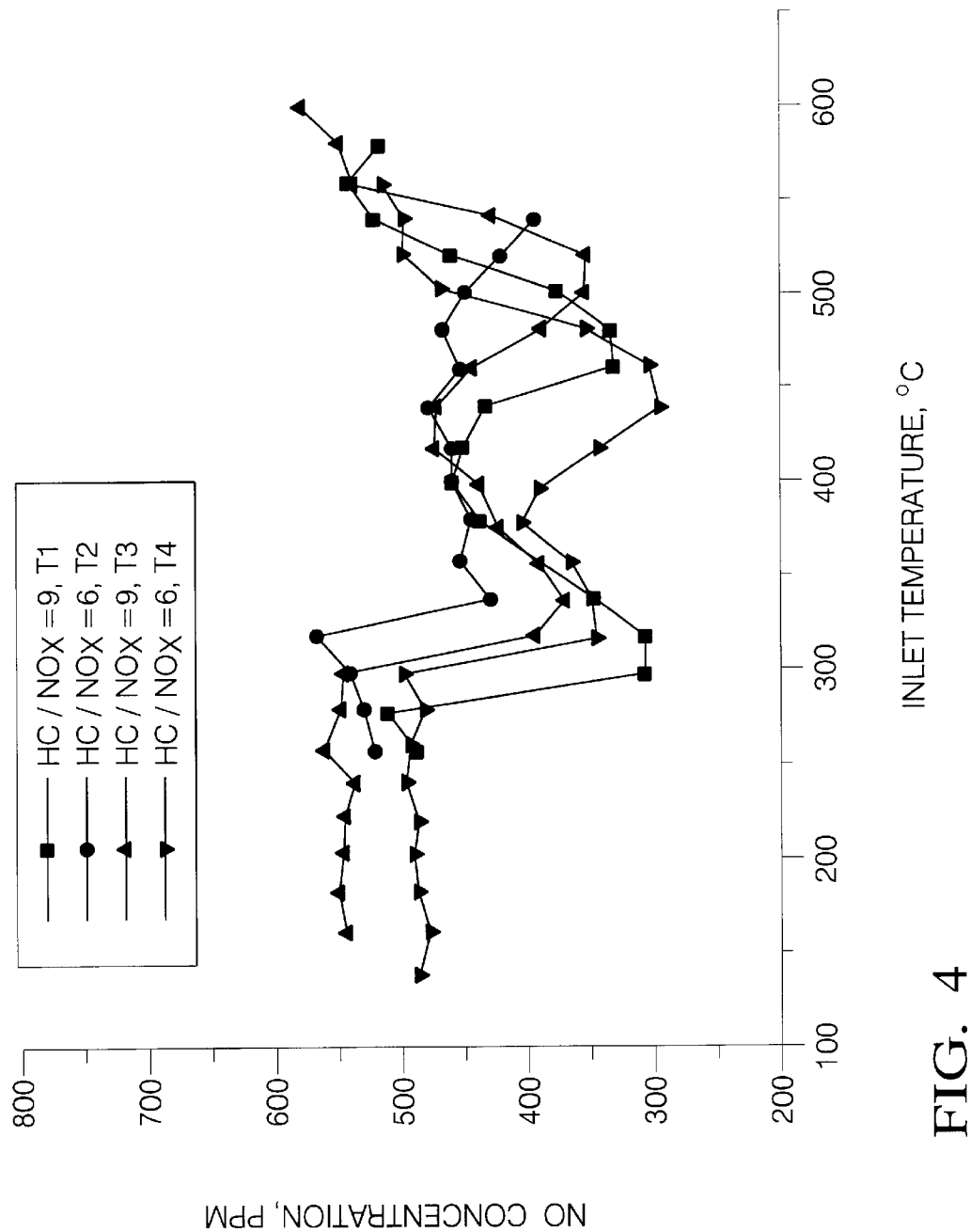
FIG. 4 is a plot of NO conversion versus inlet temperature.

The dependence of NOx and NO concentrations on temperature at the catalyst inlet is shown in FIGS. 3 and 4. As expected, the amount of nitrogen oxide (NO) present in the exhaust was always less than or equal to the amount of NOx in the exhaust, since NOx is simply the sum of NO and $NO_2$. In these tests, the fraction NO/NOx was always greater than 0.9 in native diesel exhaust. As shown, NOx concentration at the catalyst inlet is nearly independent of temperature, except for an excursion to lower concentrations that occurs around 300° C. The NO results exhibit more structure, with the concentration declining in two steps at about 300° C. and at about 400° C. and rising again at about 350 ° C. and about 450° C.

Figure 5:
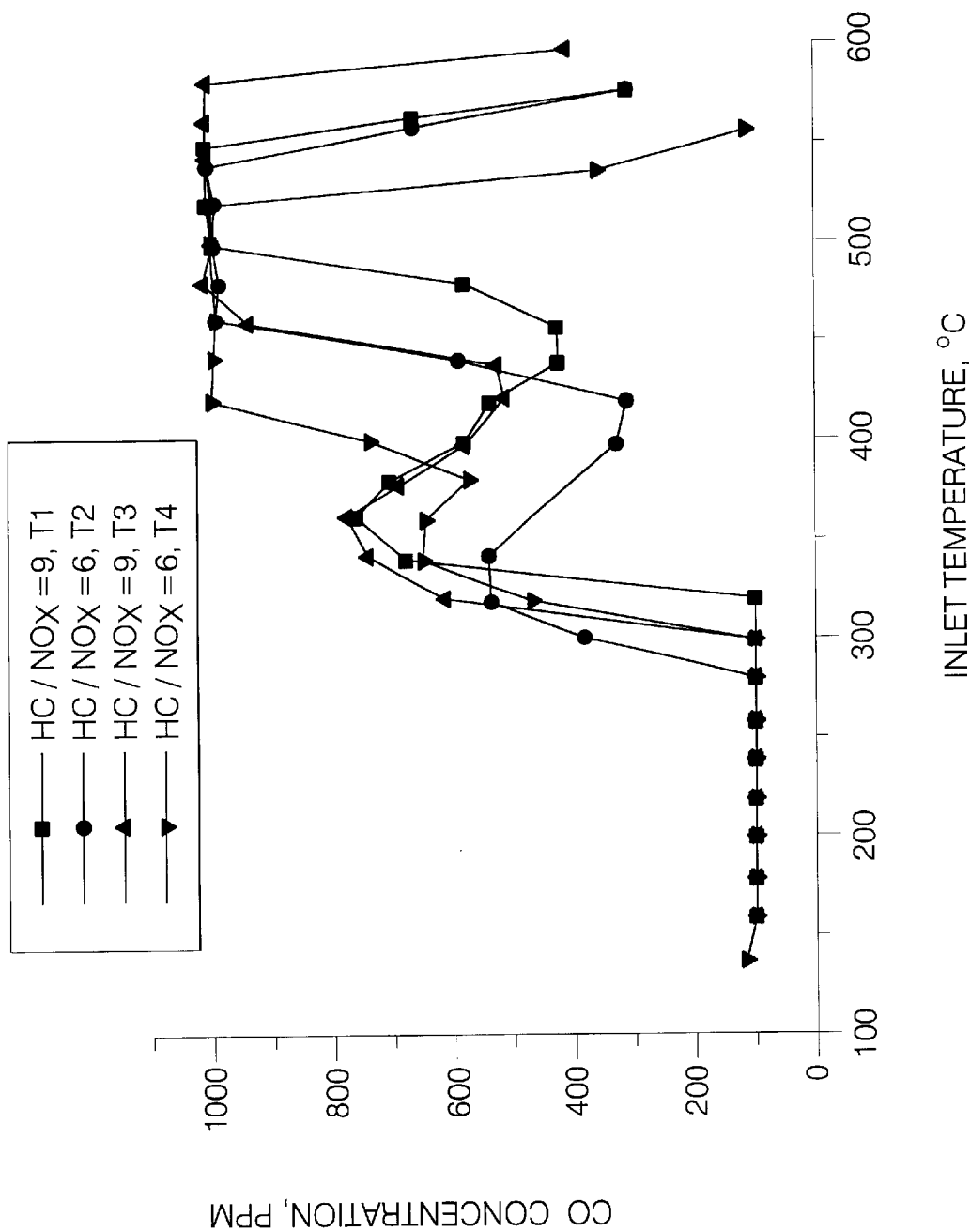
FIG. 5 is a plot of CO concentration versus inlet temperature.

FIG. 5 depicts catalyst inlet CO concentration with respect to temperature. CO concentrations emitted from the engine were about 100 ppm. At about 350° C., CO concentrations increased, then decreased, increased again to concentrations over 1,000 ppm before finally decreasing to concentrations of 100–500 ppm at inlet temperatures between 550–600° C. The obvious source of CO at higher temperatures is partial oxidation of the injected hydrocarbons. The strong anticorrelation between HC and CO is more apparent in FIG. 6, where HC, and CO inlet concentrations in test T3 are plotted against temperature.

Not to be limited by theory, it is believed that all of the preceding chemistry essentially occurs in the exhaust after HC enters the exhaust system, but prior to reaching the catalyst inlet (i.e., in zone 1). Low-temperature hydrocarbon oxidation proceeds by different dominant reaction pathways at different temperatures. As shown in Table I, three key temperature regimes occur. Scheme I outlines reactions involved in each temperature regime that do not involve NOx.

TABLE I

| No. | Reaction |
|---|---|
| | Scheme I |
| (1a) | $R-H + O_2 \rightarrow R + HO_2$ |
| (1b) | $R-H + OH \rightarrow R + H_2O$ |
| (2) | $R + O_2 = RO_w^*$ |
| Kinetic Regime 1 | |
| (3) | $RO_2^* + M \rightarrow RO_2 + M$ |
| (4) | $RO_2 + R-H \rightarrow RO_2H + R$ |
| | $RO_2H \rightarrow RO + OH$ |
| | $RO \rightarrow\rightarrow$ facile oxidation to CO, $CO_2$, etc. |

TABLE I-continued

| No. | Reaction |
|---|---|
| Kinetic Regime 2 | |
| (5) | $RO_2^* \rightarrow QOOH^* \rightarrow$ alkene + $HO_2$ |
| Kinetic Regime 3 | |
| (6) | $QOOH^* + M \rightarrow QOOH$ |
| (7) | $QOOH + O_2 \rightarrow O_2QOOH$ |
| (8) | $O_2QOOH \rightarrow HO_2Q'O_2H$ |
| (9) | $HO_2Q'O_2H \rightarrow$ carbonyls + 2OH |
| | Scheme II |
| (10) | $RO_2 + NO \rightarrow RO + NO_2$ |
| (11) | $HO_2 + NO \rightarrow HO + NO_2$ |
| (12) | $R + NO_2 \rightarrow R-NO_2$ |
| (13) | $O_2 + R-NO_2 \rightarrow CO_2 + H_2O + NOx$ |

The lowest temperature regime is described by reactions (1) through (4). Hydrocarbon oxidation is initiated by reaction (1), that is, by hydrogen atom abstraction of hydrocarbons by the highly reactive hydroxyl radical, whose presence in air is very low, but nonzero. The resultant hydrocarbon radical R adds molecular oxygen ($O_2$) to yield a peroxy radical (reaction (2)). This peroxy radical occurs initially in an excited state whose lifetime and reactivity is a function of environmental temperature. When the temperature is relatively low, the $RO_2$ radical is relaxed to the ground state by collisions with other molecules in the gas mixture (primarily $N_2$ and $O_2$ which are abundant). This reaction is described in reaction (3), where M represents the gas that converts the excess internal energy of the $RO_2^*$ excited into thermal (primarily translational) energy. The ground state peroxy radicals then react according to reactions (4) with more hydrocarbon C-H bonds yielding peroxides and hydrocarbon radicals. The peroxides decompose to give back OH radicals, which carry the radical chain and RO alcoxy radicals, which are readily oxidized further to CO, $CO_2$ and $H_2O$ and may result in additional net radical formation. These reactions proceed more rapidly as temperature increases, and parasitic reactions cause hydrocarbons to disappear to an increasing extent as temperatures rise, provided sufficient residence time. These reactions describe the essential chemistry observed below about 350° C.

An intermediate temperature range occurs between about 350° C. and about 450° C. The observed chemistry is characterized by decreases in hydrocarbon oxidation rates with increases in temperature. These temperatures may be referred to as the Negative Temperature Coefficient (NTC) range because the hydrocarbon reaction rates decrease in this temperature range. At these temperatures, a rearrangement reaction of the excited $RO_2^*$ radical turns on. An internal hydrogen atom transfer from carbon to terminal oxygen yields different peroxy radicals, $QOOH^*$, with unpaired spin density at carbon rather than terminal oxygen, as described in the first half of reaction (5). At low temperatures, this first portion of reaction (5) is slow compared with reaction (3). At somewhat higher temperatures, the rearrangement proceeds to generate $QOOH^*$ which then decomposes to yield an alkene and $HO_2$, completing reaction (5). To the extent that reaction (5) occurs, the overall reactivity of the system decreases. Reactions (4) are short-circuited and less reactive $HO_2$ radicals build up. Hydrocarbon conversion declines as temperature increases and partial oxidation becomes more important. Overall hydrocarbon concentrations rise with increasing temperature.

Fewer hydrocarbon molecules proceed through reactions (4), resulting in less formation of CO, and thus in decreased CO levels.

As temperature increases further, thermal relaxation of QOOH* (reaction (6)) starts to compete with decomposition of QOOH* (reaction (5)). The result is formation of reactive QOOH species that add oxygen that, after rearrangement or hydrogen atom abstraction from another R-H, yield a highly oxidized intermediate HOOQ'OOH (reactions (7) and (8)). The HOOQ'OOH intermediates fall apart to yield carbonyls and two OH radicals (reaction (9)). Many carbonyls may be sufficiently reactive to activate $O_2$, increasing the number of radical chains. The lifetime of carbonyls in zone 1 is expected to be low, although at low residence times a fraction may survive. The overall process dominant at these temperatures (reactions (1a and 1b), then (2), (5), (6), (7), (8), and (9)) results in formation of two OH while consuming only one OH. Concentration of the highly reactive OH radicals thus increases, so reaction rates rise with increasing temperatures in this kinetic regime. Once again, homogeneous hydrocarbon reactions deplete hydrocarbons from the gas phase very extensively unless residence time is sufficiently short. CO concentrations rise as hydrocarbon oxidation leads to CO as a stable kinetic product.

Figure 6:
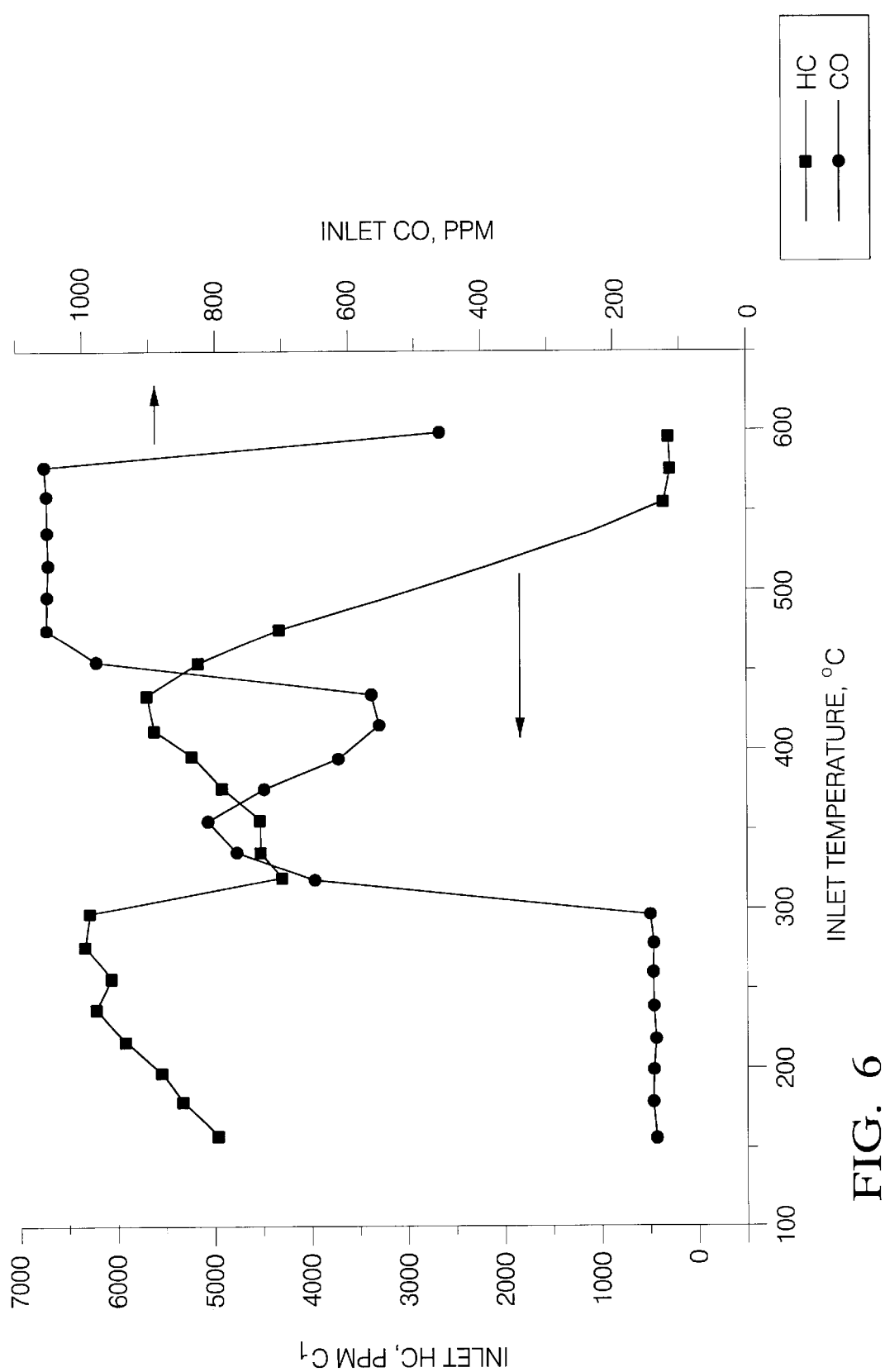
FIG. 6 is a plot of inlet HC concentration versus inlet temperature.

FIG. 6 shows the out-of-phase correlation of CO and HC concentrations detected after the homogeneous reaction zone (i.e., at the catalyst inlet). The three kinetic regimes are manifest in decreasing, then increasing, then decreasing HC concentrations. Similarly these three regimes are manifest in increasing, then decreasing, then increasing CO concentrations.

As temperatures rise, and reaction rates increase, very short residence times are required in order to minimize parasitic hydrocarbon oxidation. Of course, parasitically oxidized hydrocarbons are, by definition, not available for downstream lean NOx catalysts to use for NOx reduction.

Figure 7:
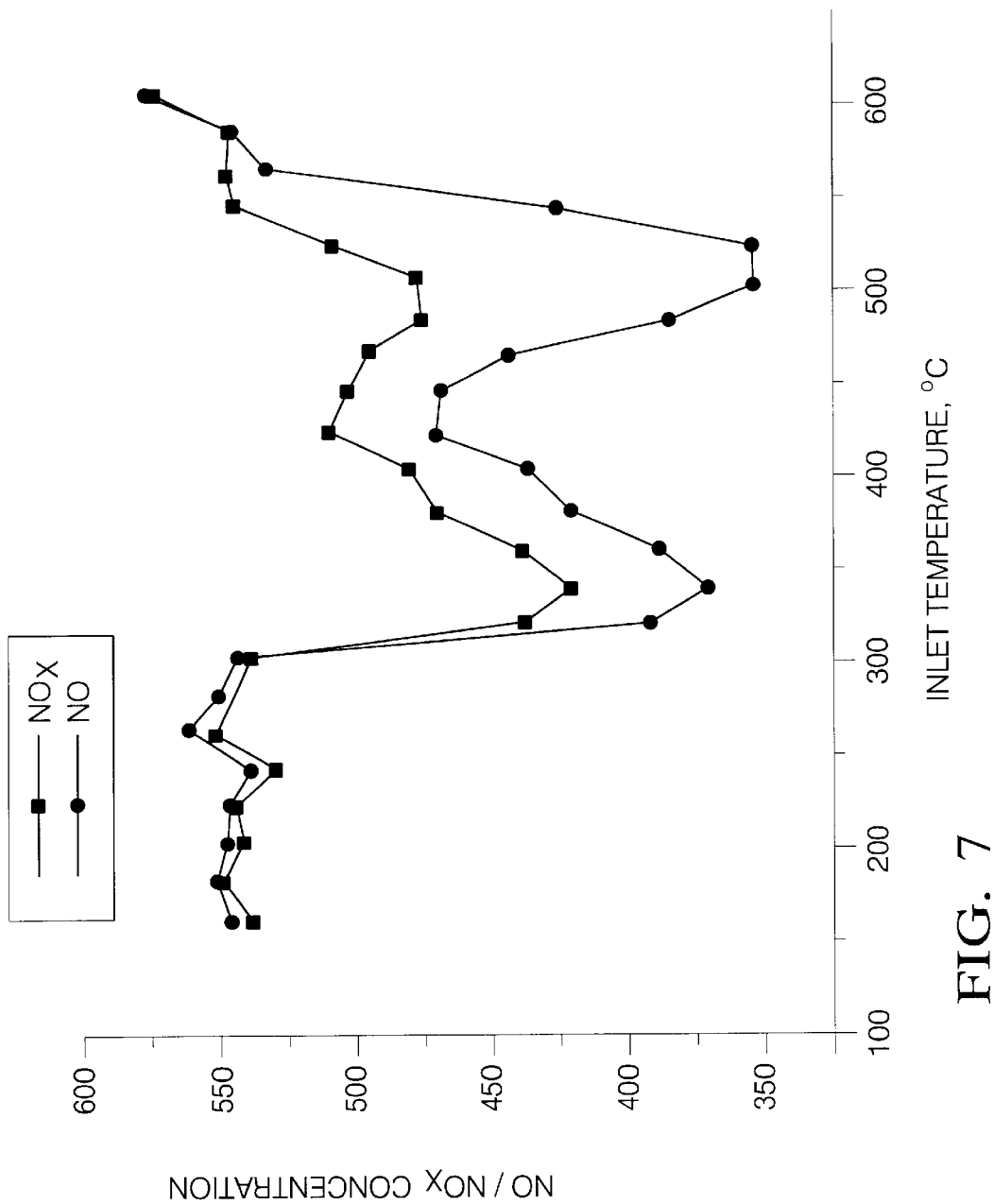
FIG. 7 is a plot of NO or NOx concentration versus inlet temperature.
Figure 8:
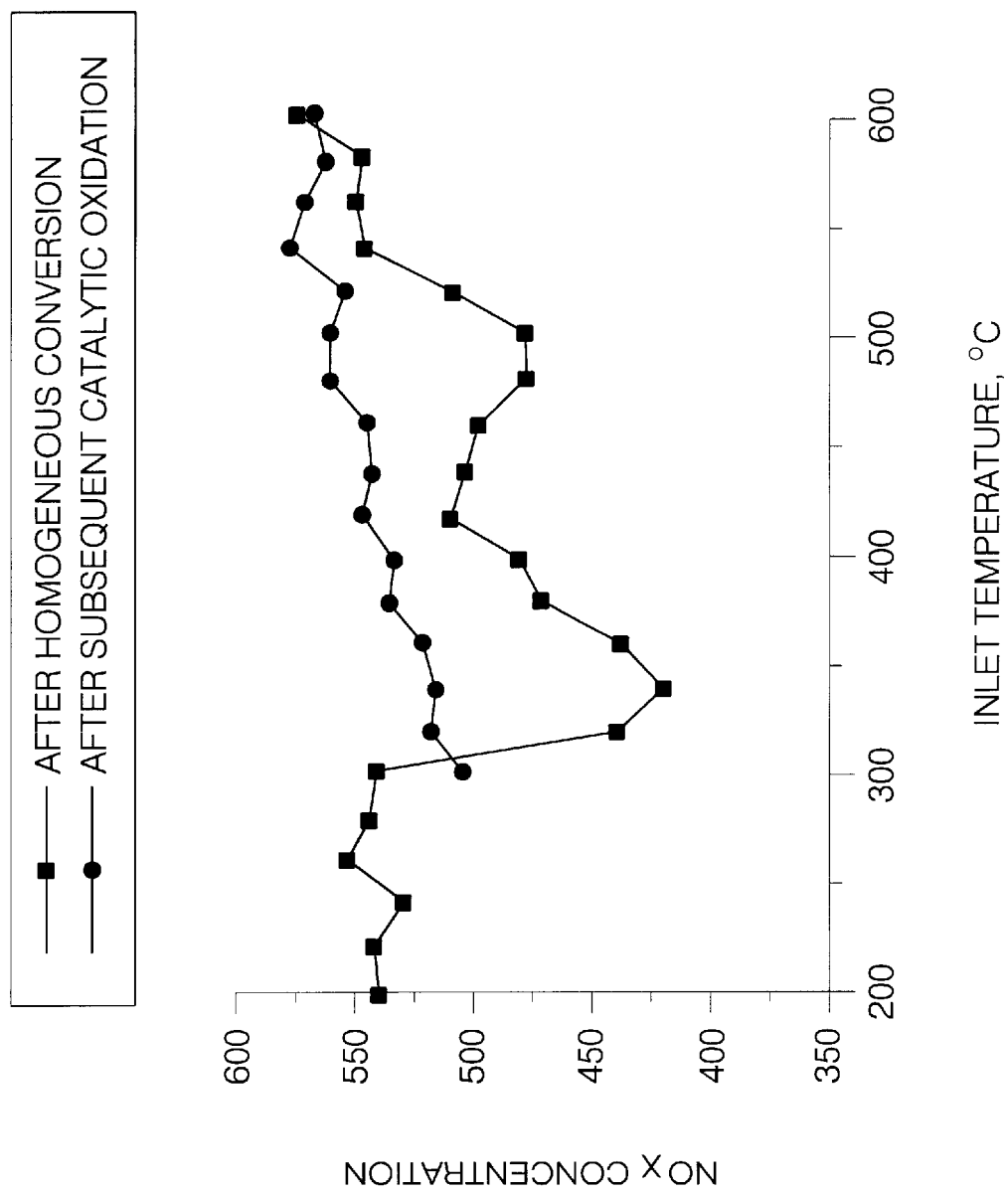
FIG. 8 is a plot of NOx concentration versus inlet temperature.

The reactions of Scheme II are perturbations on the reactions of Scheme I, and account for the observed NOx chemistry. $RO_2$ radicals produced in reaction (3) can consume NO in reaction (10), shifting NO to $NO_2$. The data shown in FIG. 7 indicate reaction (10) occurs both in Regime 1 and Regime 3, and that this reaction is relatively more important in Regime 3. Reaction (11), involving shifting of NO to $NO_2$ by $HO_2$, may play a role in decreasing the temperature range over which NTC phenomena occurs by providing a path for regenerating reactive OH radicals. $NO_2$ also appears to disappear in the lowest temperature regime. This chemistry may be described by reaction (12) where $NO_2$ combines with hydrocarbon radicals, yielding nitroalkanes or organonitrites (or organonitrates when the hydrocarbon radical is RO). FIG. 11 indicates reaction (12) appears relatively important in Regime 1. Formation organoperoxynhrates such as PAN (peroxyacetylnitrate), is not expected at these elevated temperatures since equilibrium disfavors these compounds, relative to $NO_2$ and peroxyacyl radicals, as temperature is increased near room temperature. FIG. 8 shows that NOx concentrations increase after passing the gas mixture over a Pt-based oxidation catalyst, thus demonstrating that reaction (12) occurs to an appreciable extent.

Figure 9:
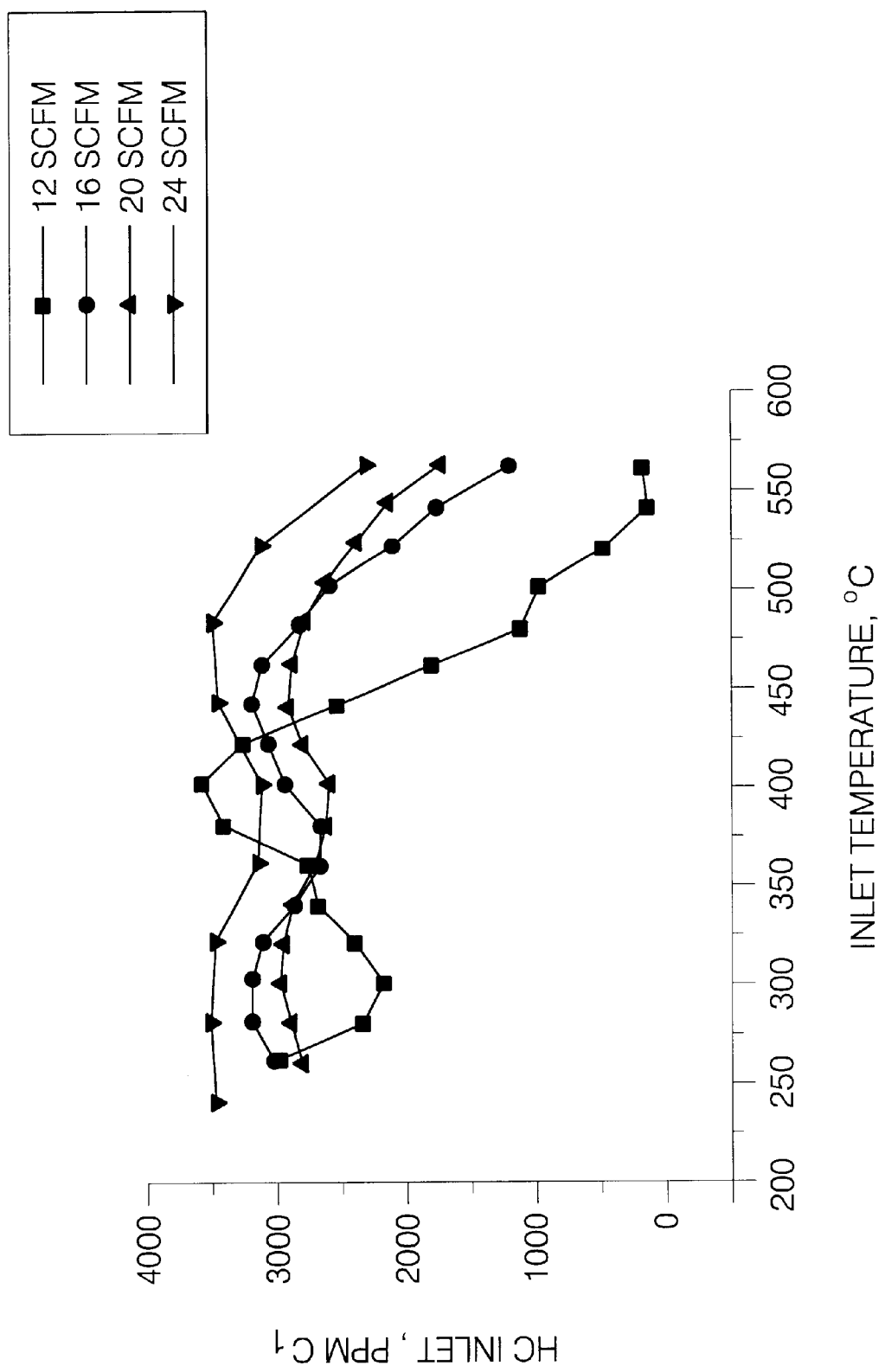
FIG. 9 is a plot of inlet HC concentration versus inlet temperature.
Figure 10:
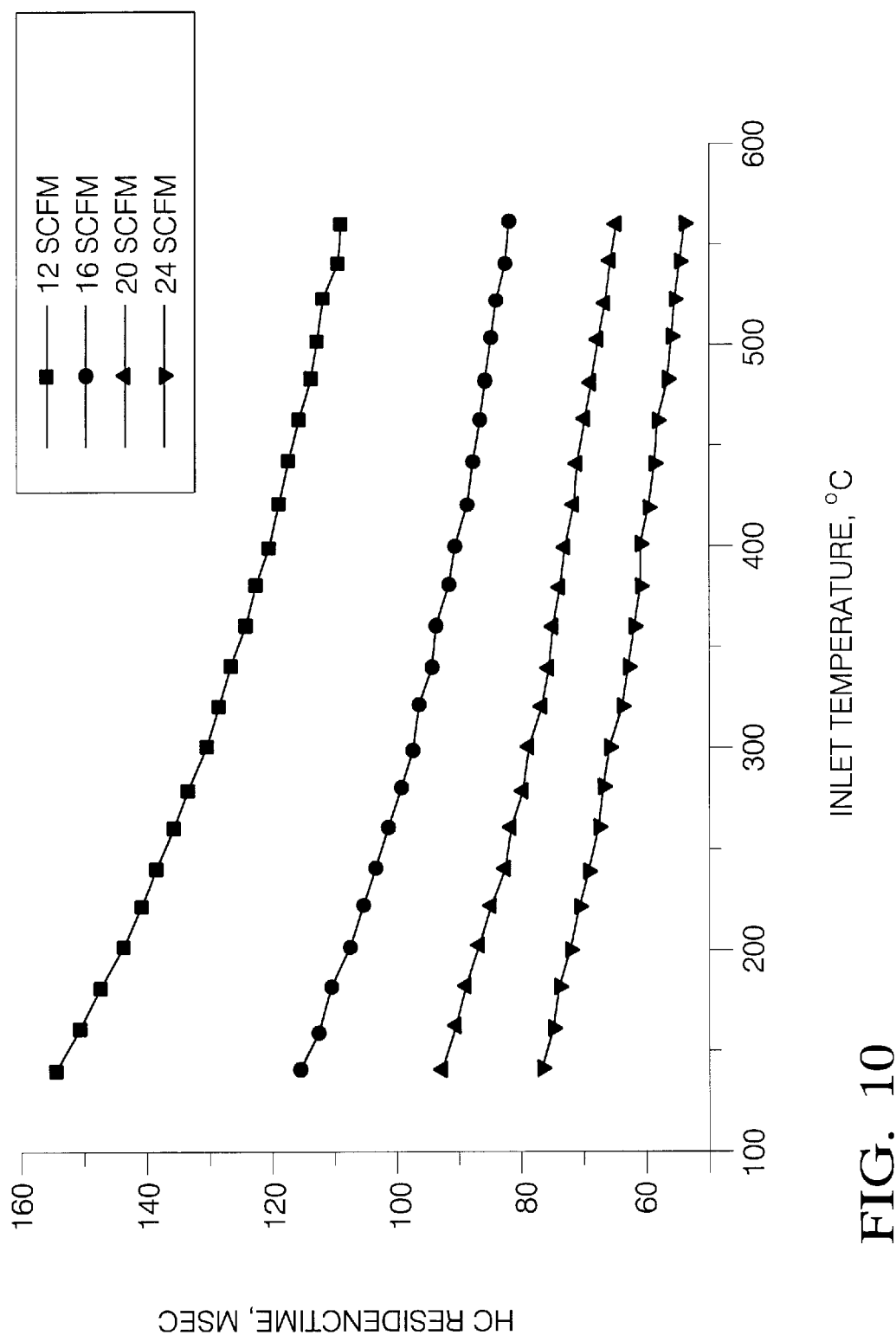
FIG. 10 is a plot of HC residence time versus inlet temperature.

Thus, the extent of parasitic oxidation chemistry depends on the pre-catalyst residence time of the hydrocarbon. FIG. 9 shows that altering the flow rate through zone 1 alters the extent of parasitic oxidation that occurs there. The data in FIG. 9 pertain to injection of diesel fuel into the exhaust. Similar trends are observed when neat decane is injected. Increasing the flow rate to about 24 scfm significantly reduced the extent of homogeneous oxidation in zone 1. FIG. 10 shows the temperature dependent residence time in zone 1 at the four flow rates examined. Hydrocarbons can be delivered to zone 2 with less than 75% parasitic oxidation in zone 1, provided the residence time of HC in zone 1 is about 55 to about 75 msec. Parasitic homogeneous oxidation consumes less than about 25% of the hydrocarbons injected at 550° C. Moreover, as shown in FIG. 9, less than about 15% of hydrocarbons undergo parasitic hydrocarbon oxidation when injected within the temperature range of about 300° C. to about 500° C. and at a flow rate of about 24 scfm. As shown in FIG. 10, residence time was within the range of about 60 msec to about 75 msec under these conditions.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A method of NOx abatement in a NOx abatement system, comprising:

generating a gas stream containing NOx and hydrocarbons;

maintaining the temperature of said gas stream within said NOx abatement system within the range of about 300° C. to about 550° C.;

controlling a pre-catalyst residence time of said hydrocarbons so as to reduce the rate of hydrocarbon oxidation; and contacting said gas stream with a NOx abatement catalyst to form a first post-catalyst gas stream;

adding additional hydrocarbons to said first post-catalyst gas stream;

maintaining the temperature of said first post-catalyst gas stream within the range of about 150° C. to about 550° C.;

controlling a second pre-catalyst residence time of said first post-catalyst gas stream so as to reduce the rate of hydrocarbon oxidation;

contacting said first post-catalyst gas stream with a subsequent NOx abatement catalyst.

2. A method according to claim 1 wherein the percentage of hydrocarbons oxidized upstream of each subsequent NOx abatement catalyst is less than about 35%.

3. A method according to claim 1 wherein the percentage of hydrocarbons oxidized upstream of each subsequent NOx abatement catalyst is less than about 25%.

4. A method according to claim 1 wherein the percentage of hydrocarbons oxidized upstream of each subsequent NOx abatement catalyst is less than about 15%.

5. A method according to claim 1 wherein the residence time of said hydrocarbons upstream of each subsequent NOx abatement catalyst is less than about 95 milliseconds.

6. A method according to claim 1 wherein the residence time of said hydrocarbons upstream of each subsequent NOx abatement catalyst is less than about 85 milliseconds.

7. A method according to claim 1, further comprising: maintaining the temperature of said gas stream within the range of about 300° C. to about 500° C.

8. A method according to claim 1, wherein said NOx abatement catalyst is platinum, palladium, ruthenium, rhodium, osmium, and iridium, gold, copper, silver, gallium, indium, tin, zeolite, or alloys, salts or mixtures thereof dispersed on a support.

9. A method according to claim 1 wherein said support is alumina, cordierite, silica or a mixture thereof.

10. A method according to claim 1, further comprising repeating the steps itemized in claim 11.

11. A method of NOx abatement in a NOx abatement system, comprising:

maintaining a gas stream within the NOx abatement system at a temperature of about 300° C. to about 550° C., wherein said gas stream comprises hydrocarbons and NOx;

introducing said gas stream to a catalyst;

wherein a residence time of said hydrocarbons upstream of said catalyst is less than about 95 milliseconds.

12. A method according to claim 11, wherein said temperature is about 350° C. to about 500° C.

13. A method according to claim 11, wherein the residence time of said hydrocarbons upstream of said NOx abatement catalyst is less than about 85 milliseconds.

14. A method according to claim 11, wherein the residence time of said hydrocarbons upstream of said NOx abatement catalyst is less than about 75 milliseconds.

15. A method according to claim 14, wherein said residence time is about 55 to about 75 milliseconds.

16. A method according to claim 14, wherein said residence time is about 20 to about 60 milliseconds.

17. A method according to claim 11, wherein the catalyst comprises silver.

18. A method of NOx abatement in a NOx abatement system, comprising:

maintaining a gas stream within the system at a temperature of about 350° C. to about 500° C., wherein said gas stream comprises hydrocarbons and NOx;

controlling the residence time of said hydrocarbons upstream of a catalyst such that a percentage of said hydrocarbons oxidized upstream of said catalyst is less than 75%.

19. A method according to claim 18, wherein the residence time of said hydrocarbons upstream of each subsequent NOx abatement catalyst is less than about 95 milliseconds.

20. A method according to claim 19, wherein the residence time of said hydrocarbons upstream of said NOx abatement catalyst is less than about 85 milliseconds.

21. A method according to claim 20, wherein the residence time of said hydrocarbons upstream of said NOx abatement catalyst is less than about 75 milliseconds.

22. A method according to claim 21, wherein said residence time is about 55 to about 75 milliseconds.

23. A method according to claim 21, wherein sad residence time is about 20 to about 60 milliseconds.

24. A method for NOx abatement in a NOx abatement system, comprising:

maintaining a gas stream within the system at a temperature of about 300° C. to about 550° C., wherein said gas stream comprises hydrocarbons and NOx; and introducing said gas stream to a catalyst comprising silver;

wherein a residence time of said hydrocarbon upstream of said catalyst is less than about 95 milliseconds and wherein a percentage of said hydrocarbon oxidized upstream of said catalyst is less than 75%.

25. A method according to claim 24, wherein the residence time of said hydrocarbons upstream of said NOx abatement catalyst is less than about 85 milliseconds.

26. A method according to claim 25, wherein the residence time of said hydrocarbons upstream of said NOx abatement catalyst is less than about 75 milliseconds.

27. A method according to claim 25, wherein said residence time is about 55 to about 75 milliseconds.

28. A method for NOx abatement in a NOx abatement system, comprising:

maintaining a gas stream within the system at a temperature of about 300° C. to about 550° C., wherein said gas stream comprises hydrocarbons and NOx; and introducing said gas stream to a catalyst;

wherein a percentage of said hydrocarbon oxidized upstream of said catalyst is less than 75%.

29. A method according to claim 28, wherein the residence time of said hydrocarbons upstream of said NOx abatement catalyst is less than about 85 milliseconds.

30. A method according to claim 29, wherein the residence time of said hydrocarbons upstream of said NOx abatement catalyst is less than about 75 milliseconds, and wherein said catalyst comprises silver.

31. A method according to claim 29, wherein said residence time is about 55 to about 75 milliseconds.

32. A method for NOx abatement in a NOx abatement system, comprising:

maintaining a gas stream within the system at a temperature of about 300° C. to about 550° C., wherein said gas stream comprises hydrocarbons and NOx; and introducing said gas stream to a catalyst, wherein said catalyst is selected from the group consisting of platinum, palladium, ruthenium, rhodium, osmium, and iridium, gold, copper, silver, gallium, indium, tin, zeolite, and alloys, salts, and mixtures thereof;

wherein a percentage of said hydrocarbon oxidized upstream of said catalyst is less than 75%.

33. A method according to claim 32, wherein the residence time of said hydrocarbons upstream of said NOx abatement catalyst is less than about 85 milliseconds.

34. A method according to claim 33, wherein the residence time of said hydrocarbons upstream of said NOx abatement catalyst is less than about 75 milliseconds, and wherein said catalyst comprises silver.

* * * * *